United States Patent [19]
Maki et al.

[11] Patent Number: 5,642,162
[45] Date of Patent: Jun. 24, 1997

[54] CHARGE TRANSFER DEVICE HAVING A SIGNAL PROCESSING CIRCUIT FOR CORRECTING OUTPUT VOLTAGE

[75] Inventors: Yasuhito Maki; Maki Sato; Tadakuni Narabu; Tadao Takagi, all of Kanagawa; Hiroyuki Iwasaki, Tokyo; Tetsuro Goto, Chiba, all of Japan

[73] Assignees: Sony Corporation; Nikon Corporation, both of Tokyo, Japan

[21] Appl. No.: 631,928

[22] Filed: Apr. 15, 1996

Related U.S. Application Data

[63] Continuation of Ser. No. 352,035, Nov. 30, 1994, abandoned.

[30] Foreign Application Priority Data

Dec. 3, 1993 [JP] Japan ................... 5-339611

[51] Int. Cl.⁶ .................................................. H04N 3/14
[52] U.S. Cl. .................................. 348/241; 348/243
[58] Field of Search .......................... 348/241, 243, 348/245, 250

[56] References Cited

U.S. PATENT DOCUMENTS

| | | |
|---|---|---|
| 3,979,582 | 9/1976 | Mims . |
| 4,375,059 | 2/1983 | Schlig . |
| 4,412,343 | 10/1983 | Kosonocky ................ 377/58 |
| 4,602,291 | 7/1986 | Temes ...................... 348/243 |
| 4,675,549 | 6/1987 | Steffe et al. ............... 348/241 |
| 4,839,729 | 6/1989 | Ando et al. ............... 348/241 |
| 4,914,519 | 4/1990 | Hashimoto et al. ........ 348/241 |
| 5,132,801 | 7/1992 | Yamano ................... 348/241 |
| 5,278,658 | 1/1994 | Takase ..................... 348/243 |
| 5,386,230 | 1/1995 | Jeng ........................ 348/241 |
| 5,408,314 | 4/1995 | Perry et al. .............. 356/301 |
| 5,408,335 | 4/1995 | Takahashi et al. ........ 348/241 |

FOREIGN PATENT DOCUMENTS

| | | |
|---|---|---|
| 0016629 | 1/1980 | European Pat. Off. ......... H04N 3/15 |
| 0 016 629 | 10/1980 | European Pat. Off. . |
| 0 439 912 | 8/1991 | European Pat. Off. . |
| 55-163952 | 12/1980 | Japan . |
| 59-050560 | 3/1984 | Japan . |
| 2078382 | 3/1990 | Japan . |

*Primary Examiner*—Wendy Garber
*Attorney, Agent, or Firm*—Hill, Steadman & Simpson

[57] ABSTRACT

A charge transfer device includes a circuit which can correct a fluctuated amount of light (charge amount)—output voltage characteristic with accuracy even when fluctuated by the change of temperature and the fluctuation of a power supply voltage. An output voltage characteristic in the standard state corresponding to a reference charge is stored and held in a ROM in advance. An ALU (arithmetic logical unit) corrects the light (charge amount)—output voltage characteristic by using the output voltage characteristic in the standard state corresponding to the reference charge stored in the ROM and the output voltages corresponding to the reference charge inputs from reference charge input portions in an imaging state, and corrects an output voltage (Va) corresponding to a signal charge in a practical imaging state.

17 Claims, 5 Drawing Sheets

Solid Line : t1
Broken Line : t2

Reset Pulse φrs

Buffer Output Va

CHARGE TRANSFER DEVICE HAVING A SIGNAL PROCESSING CIRCUIT FOR CORRECTING OUTPUT VOLTAGE

This is a continuation of application Ser. No. 08/352,035, filed Nov. 30, 1994, now abandoned.

BACKGROUND OF THE INVENTION

1. Field of the Invention

The present invention relates to a charge transfer device for transferring a signal charge and converting and outputting a signal charge in the form of an electrical signal. More particularly, this invention relates to a charge transfer device for use as an area sensor, a linear sensor or a delay element.

2. Description of the Related Art

Figure 1:
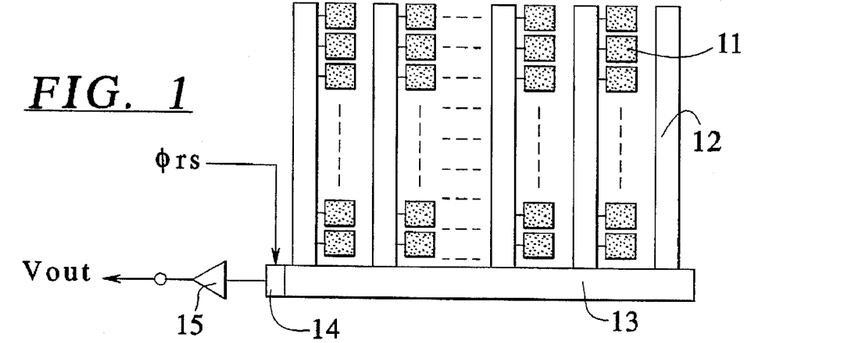
FIG. 1 is a diagram showing an arrangement of an example of an area sensor.

FIG. 1 of the accompanying drawings shows an arrangement of an example of an area sensor which is one of CCD (charge coupled device) solid state imaging devices using a charge transfer device.

As shown in FIG. 1, an area sensor comprises a plurality of photoelectric conversion elements (referred to hereinafter as "photosensors") arrayed in a matrix fashion, a plurality of vertical transfer registers 12 arrayed at every vertical column of the photosensors 11 for transferring signal charges read out from the photosensors 11 in the vertical direction, a horizontal transfer register 13 for transferring the signal charges transferred from these vertical transfer registers 12 in the horizontal direction and a charge detecting portion or charge converting means 14 for detecting the signal charge transferred by the horizontal transfer register 13 and converting and outputting the same in the form of a signal voltage.

The charge detecting portion 14 is formed of a floating diffusion (FD) region and reset in response to a reset pulse $\phi$rs supplied thereto at every predetermined period. An output of the charge detecting portion 14 is developed through an output buffer 15 as an output voltage Vout.

Figure 2:
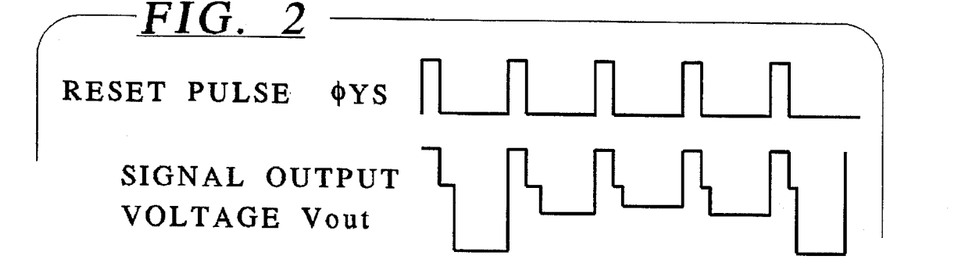
FIG. 2 is a diagram of waveforms of a reset pulse and a signal output voltage to which reference will be made in explaining the area sensor shown in FIG. 1.

FIG. 2 is a diagram of waveforms of the reset pulse $\phi$rs and the signal output Vout.

In this kind of the charge transfer device, a relationship between an amount (intensity) of light incident on the photosensor 11 (or charge amount of resultant signal charges) and the corresponding output voltage Vout of the output buffer 15, i.e., amount of light (charge amount)—output voltage characteristic is considerably fluctuated with states, such as power supply voltage and temperature.

Figure 3A:
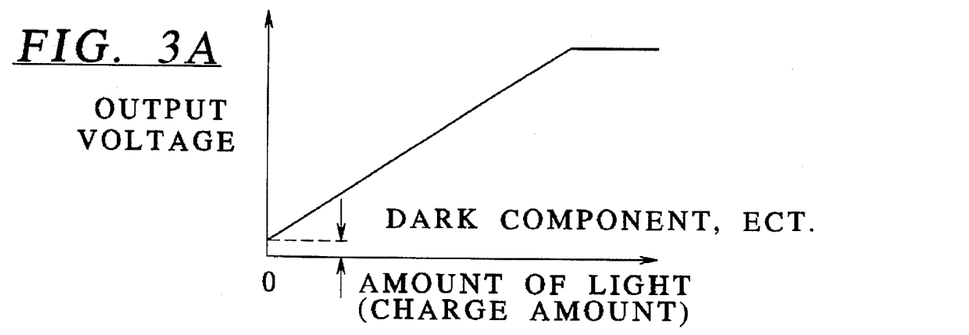
FIG. 3A is a characteristic graph showing measured results of an amount of light (charge amount)—output voltage characteristic obtained in the standard state.
Figure 3B:
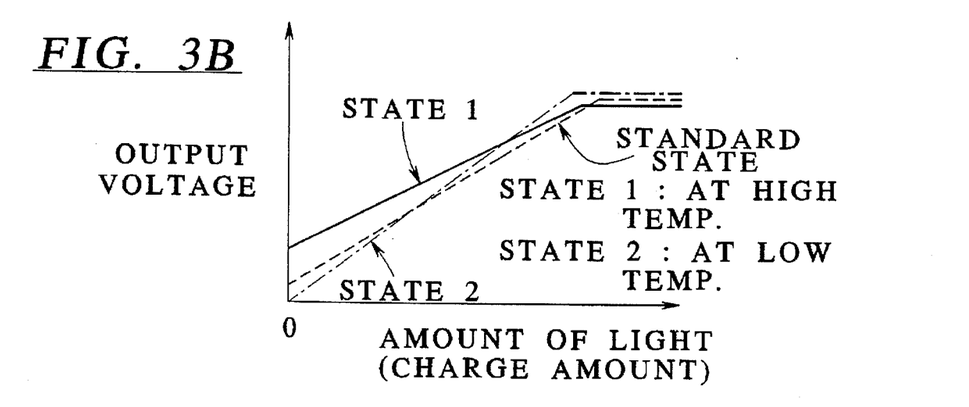
FIG. 3B is a characteristic graph showing measured results of an amount of light (charge amount)—output voltage characteristic obtained when the state is changed.

FIGS. 3A, 3B are graphs showing measured results of amount of light (charge amount)—output voltage characteristics. FIG. 3A shows the amount of light (charge amount)—output voltage characteristic obtained in the standard state. FIG. 3B shows the light amount (charge amount)—output voltage characteristic obtained when the state (e.g., temperature) was changed.

Study of the characteristic diagram shown in FIG. 3B reveals that the output voltage Vout tends to increase as the temperature rises. This tendency becomes remarkable particularly when an amount of light is small. However, although the temperature is low, the output voltage Vout increases in the portion with large intensity and an inclination of a straight line changes minutely in response to the temperature. Also, when the power source voltage is fluctuated, it is natural that the charge amount—output voltage characteristic also is fluctuated.

As described above, it is to be appreciated that, when the amount of light (charge amount)—output voltage is considerably fluctuated with the power source voltage and the temperature, the output voltage Vout corresponding to the same amount of light (charge amount) also is considerably fluctuated with a fluctuation of the power source voltage and the change of temperature. Therefore, when the above-mentioned characteristic is fluctuated, it is necessary to correct the output voltage Vout.

There has not hitherto been proposed a proper method of detecting a fluctuated amount of the characteristic and correcting the fluctuated characteristic when the amount of light (charge amount)—output voltage characteristic is fluctuated.

Therefore, an object signal serving as a white reference is read out each time or one time in a certain state (power source voltage and temperature), and an amount of light (charge amount)—output voltage characteristic is corrected by comparing the signal level and the signal level of the black level (black level of the output signal, signal level of an optical black (OPB: optical black) or signal level of an object which becomes black reference).

According to such a method, however, a signal charge correspond to the object which becomes white reference should constantly be input or input each time the state is changed, otherwise the characteristic cannot be detected. Also, in actual practice, it is difficult to stably pick up put light from the object which becomes white reference during one field period because brightness of the object does not always become proper for white reference when the cameraman starts taking a picture in practice.

SUMMARY OF THE INVENTION

In view of the aforesaid aspect, it is an object of the present invention to provide a charge transfer device in which a fluctuation can be corrected accurately even when an amount of light (charge amount)—output voltage characteristic is fluctuated with the change of temperature and a fluctuation of a power source voltage.

According to an aspect of the present invention, there is provided a charge transfer device which is comprised of a signal charge input portion for inputting a signal charge, a reference charge input portion for inputting a reference charge, a charge transfer portion for transferring charges input thereto from the signal charge input portion and the reference charge input portion, a charge detecting portion for converting a signal charge transferred by the charge transfer portion into an electrical signal and outputting the electrical signal, and a signal processing portion associated with the charge detecting portion, wherein the signal processing portion includes a first storage portion for storing an output signal of the charge detecting portion in a standard state of the reference charge in advance, and corrects an output signal in the imaging state of the signal charge on the basis of a first output signal stored in the first storage portion and a second output signal from the charge detecting portion in the imaging state of the reference charge.

DETAILED DESCRIPTION OF THE PREFERRED EMBODIMENTS

Embodiments of the present invention will hereinafter be described with reference to the drawings.

Figure 4:
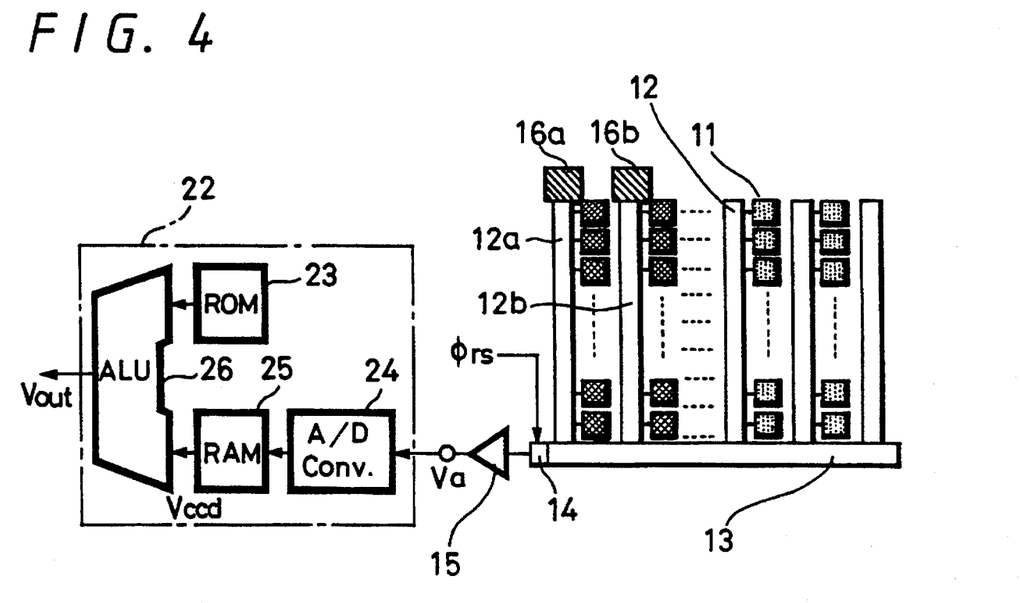
FIG. 4 is a diagram showing an arrangement of a charge transfer device according to a first embodiment of the present invention which is applied to the area sensor.

FIG. 4 is a diagram showing an arrangement of a charge transfer device according to a first embodiment of the present invention which is applied to the area sensor.

As shown in FIG. 4, there are provided a plurality of photosensors 11 arrayed in a matrix fashion to accumulate a signal charge by photoelectrically converting incident light. A plurality of vertical transfer registers 12 are disposed at every vertical column of these photosensors 11. Signal charges accumulated in the photosensors 11 are read out to these vertical transfer registers 12 through a read gate (not shown). The signal charges read out to the vertical transfer register 12 are sequentially transferred to a horizontal transfer register 13 by each amount corresponding to one scanning line.

Of a plurality of vertical transfer registers 12, two vertical transfer registers 12a, 12b provided at the left-hand end in FIG. 4, for example, include two reference charge input portions 16a, 16b from which reference charges Q1, Q2 of a predetermined amount are respectively input to the vertical transfer registers 12a, 12b. The reference charge input portions 16a, 16b are adapted to input the reference charges Q1, Q2 to the vertical transfer registers 12a, 12b according to well-known diode cutoff method or fill and spill method.

Figure 5:
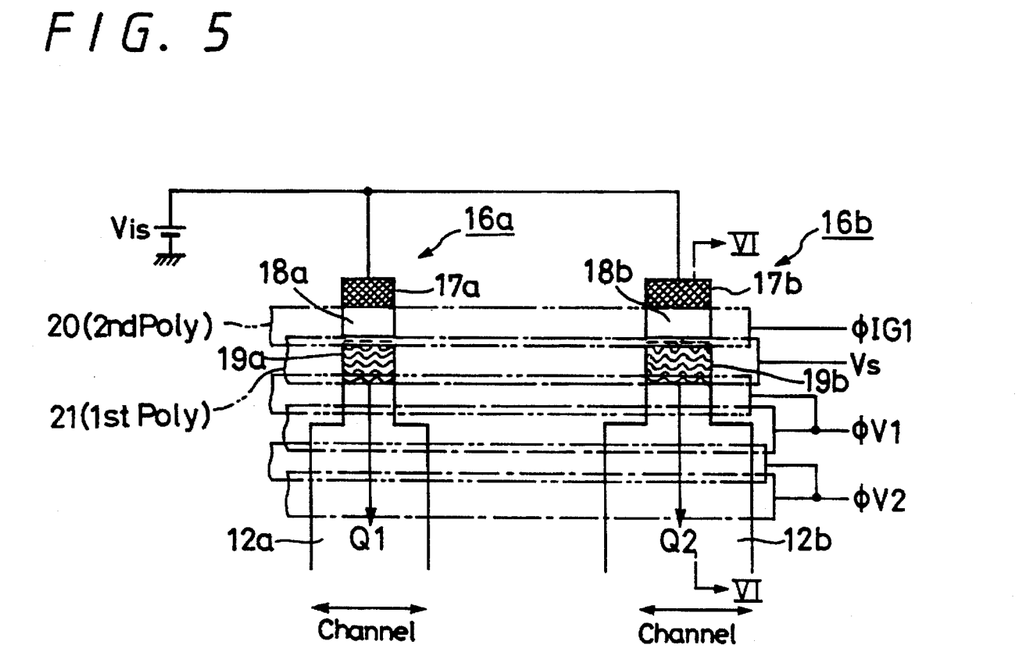
FIG. 5 is a plan view showing an example of an arrangement of a reference charge input portion using a diode cutoff method in an enlarged scale.
Figure 6:
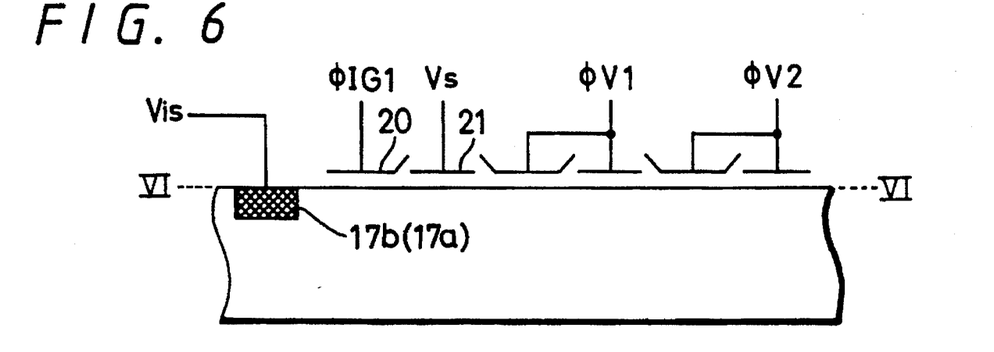
FIG. 6 is a cross-sectional view taken along the line VI—VI in FIG. 5.

FIG. 5 is a plan view showing the reference charge input portions 16a, 16b using the diode cutoff method, for example, in an enlarged scale. FIG. 6 is a cross-sectional view taken along the line VI—VI in FIG. 5.

As illustrated, the reference charge input portions 16a, 16b are composed of N+ diffusion regions 17a, 17b serving as charge implantation input diodes, input gate regions (IG1) 18a, 18b and measuring well regions (IG2) 19a, 19b adjoining the N+ diffusion regions 17a, 17b through the input gate regions 18a, 18b and which are continued to the vertical transfer registers 12a, 12b. A predetermined DC input voltage Vis is applied to the N+ diffusion regions 17a, 17b.

The input gate regions 18a, 18b have a gate electrode 20 made of a second polysilicon (2nd Poly Si) layer disposed thereon. The measuring well regions 19a, 19b have a gate electrode 21 made of a first polysilicon layer (1st Poly Si) disposed thereon. A sampling pulse φIG1 is applied to the gate electrode 20, and a predetermined DC bias voltage Vs is applied to the gate electrode 21.

Figure 7:
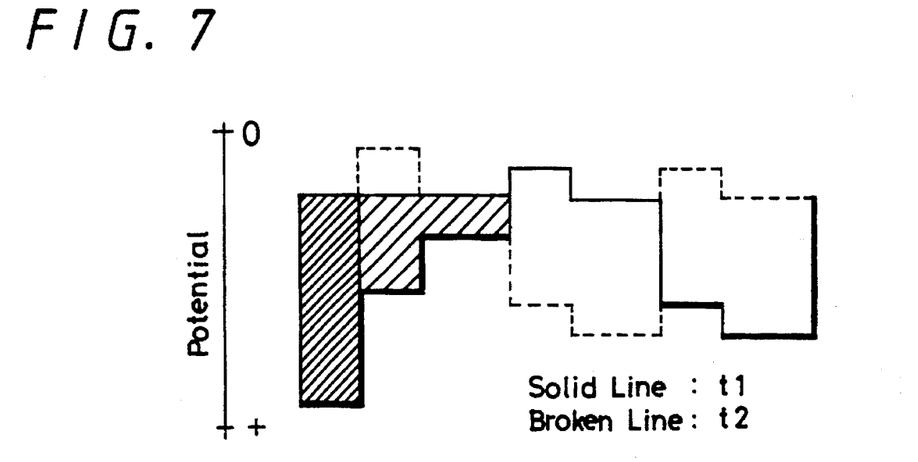
FIG. 7 is a potential diagram corresponding to the cross section in FIG. 6.
Figure 8:
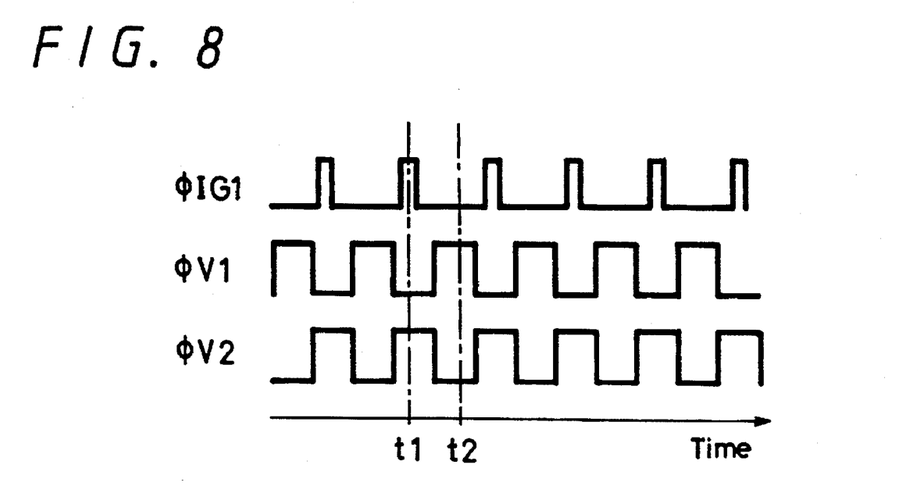
FIG. 8 is a timing chart of a sampling pulse φIG1 and transfer clocks φV1 and φV2.

FIG. 7 is a potential diagram corresponding to the cross section shown n FIG. 6. FIG. 8 is a timing chart of the sampling pulse φIG1 and transfer clocks φV1, φV2 of the vertical transfer register 12. In FIG. 7, a solid line represents a potential obtained at a timing point t1, and a broken line represents a potential obtained at a timing point t2, respectively.

Charge amounts of the reference charges Q1, Q2 input by the reference charge input portions 16a, 16b are determined by the areas of the measuring well regions (IG2) 19a, 19b. Therefore, it is possible to input the reference charges Q1, Q2 of different charge amounts to the vertical transfer registers 12a, 12b by changing the areas of the measuring well regions (IG2) 19a, 19b. Specifically, the charge amounts of the reference charges are increased as the areas of the measuring well regions are increased. Thus, a ratio of the charge amounts of the reference charges Q1, Q2 is substantially equal to a ratio of the areas of the measuring well regions 19a, 19b.

Since the vertical transfer registers 12a, 12b are pseudo-vertical transfer registers provided in order to transfer the reference charges Q1, Q2, the photosensors 11 (shown hatched in FIG. 1) of two columns corresponding to the vertical transfer registers 12a, 12b are shaded.

Referring back to FIG. 4, the signal charge of one scanning line amount that was transferred from the vertical transfer register 12 to the horizontal transfer register 13 is sequentially transferred by the horizontal transfer register 13 in the horizontal direction and supplied to the charge detecting portion 14.

The charge detecting portion 14 is formed of a floating diffusion (FD), for example. The charge detecting portion 14 detects the signal charge transferred by the horizontal transfer register 13 and converts the same into a signal voltage which is supplied to an output buffer 15 of the next stage.

The floating diffusion (FD) of the charge detecting portion 14 is reset by the reset pulse φrs at every predetermined period.

In the area sensor thus arranged, the horizontal transfer register 13 reads out the reference charge Q1 input from the reference charge input portion 16a. Then, the reference charge Q1 thus read is converted by the charge detecting portion 14 into a voltage and led out from the output buffer 15 as an output voltage V1. Subsequently, the reference charge Q2 input from the reference charge input portion 16b is read out and led out from the output buffer 15 as an output voltage V2.

Figure 9:
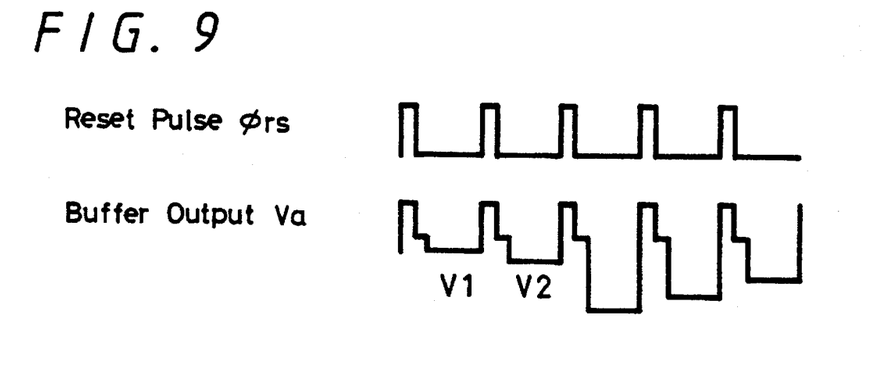
FIG. 9 is a diagram of waveforms of a reset pulse φrs and a buffer output Va.

FIG. 9 is a diagram of waveforms of the reset pulse φrs and a buffer output Va. The reference charges Q1, Q2 are read out during the horizontal blanking period of each horizontal scanning period.

Figure 10A:
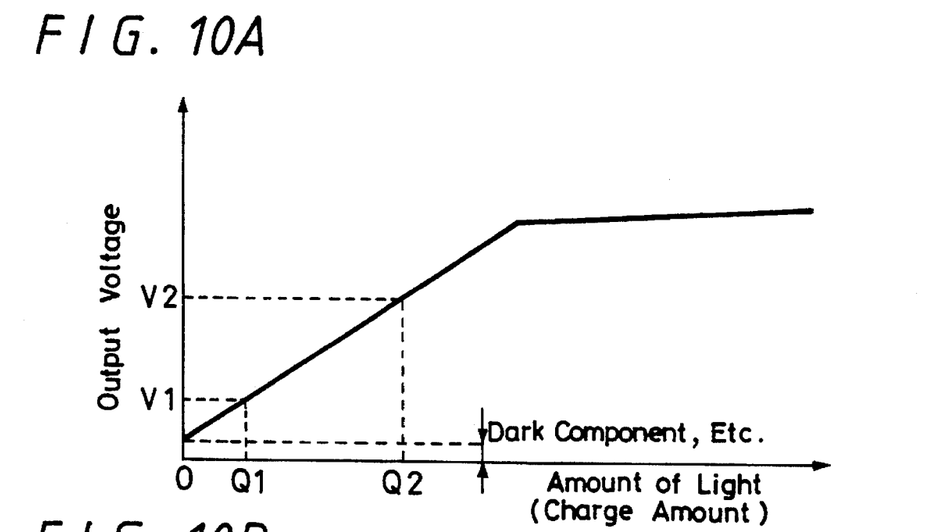
FIG. 10A is a characteristic graph showing measured results of an amount of light (charge amount)—output voltage characteristic obtained in the standard state.
Figure 10B:
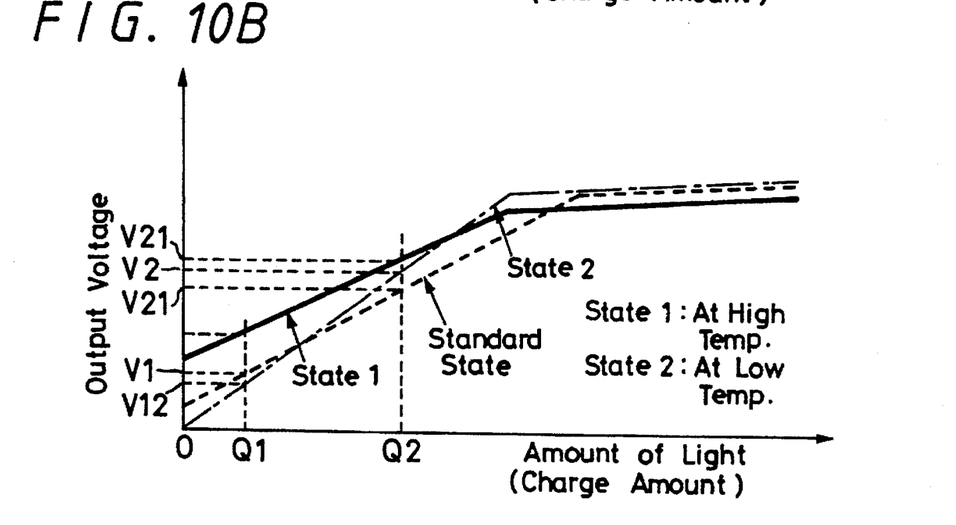
FIG. 10B is a characteristic graph showing measured results of an amount of light (charge amount)—output voltage characteristic obtained when the state is changed.

FIG. 10A is a characteristic graph showing measured results of an amount of light (charge amount)—output characteristic of the area sensor shown in FIG. 4 obtained in the standard state. FIG. 10B is a characteristic graph showing measured results of an amount of light (charge amount)—output characteristic obtained when a temperature is increased or decreased from the standard state.

In the standard state, V1 assumes an output voltage based on the reference charge Q1, and V2 assumes an output voltage based on the reference charge Q2. Then, when the temperature rises, the output voltage V1 is elevated to a voltage V11 and the output voltage V2 is elevated to a voltage V21.

Conversely, when the temperature is lowered, the output voltage V1 is lowered to a voltage V12, and the output voltage V2 is elevated to a voltage V22.

Therefore, it is possible to determine a charge amount—output voltage characteristic by detecting the current voltage values of the output voltages V1, V2 based on the reference charges Q1, Q2. To be more concrete, it is possible to detect an inclination of a straight line representing the charge amount—output voltage characteristic. The charge amounts of the reference charges Q1, Q2 have to be selected in a range in which the characteristics have a linearity.

By monitoring the charge amount—output voltage characteristic, i.e., monitoring a difference (V2–V1 in the standard state, V21–V11 in the state 1 and V22–V12 in the state 2) between the output voltages V1 and V2 based on the reference charges Q1, Q2, it is possible to compensate the fluctuation of the gain of the area sensor on the basis of the detected difference. Practical arrangement and operation of a signal processing portion 22 which realizes the compensation of the fluctuation of the gain of the area sensor will be described later on.

When the object signal has an optical black pixel, if an output voltage obtained in the portion in which the straight line representing the charge amount—output voltage characteristic crosses the vertical axis of the amount of light (charge amount) 0 in FIG. 10A, i.e., offset, such as a dark component or the like is detected and corrected by using such pixel signal, it is possible to realize the correction with higher accuracy.

An arrangement of the signal processing portion 22 shown in FIG. 4 will be described below.

In the signal processing portion 22, voltage values of the output voltages V1, V2 corresponding to the reference charges Q1, Q2 in the standard state are stored in a ROM (read only memory) 23 serving as a first memory portion in advance. The buffer output Va is converted by an A/D (analog-to-digital) converter 24 in a digital signal and temporarily stored in a RAM (random access memory) 25 serving as a second memory portion.

Because the output voltages V1, V2 corresponding to the reference charges Q1, Q2 are changed to the voltages V11 and V21 in the practical imaging condition, such as the imaging circumstances (temperature and power source voltage) like the state 1 shown in FIG. 10A, for example, an ALU (arithmetic logical unit) 26 calculates a correction amount α from the values of the voltages V11, V21 and the values of the output voltages V1, V2 previously stored in the ROM 23 on the basis of the following equation (1):

$$\alpha = (V2-V1)/(V21-V11) \quad (1)$$

Then, the ALU 26 obtains a signal output Vout by correcting an output Vccd (i.e., camera output obtained in the actual imaging state) of the RAM 25 by using the correction amount α on the basis of the following equation (2):

$$Vout = Vccd \times \alpha \quad (2)$$

The difference between the standard state and the imaging state of the output voltages V1, V2 based on the reference charges Q1, Q2 are monitored, the correction amount α is calculated based on the detected difference and the output Vccd of the RAM 25 is corrected as described above. Thus, when the offset (including a fluctuated amount of a dark current) of the output level and the fluctuation of the gain are caused by the change of temperature and the fluctuation of the power source voltage, it is possible to correct such fluctuations accurately without reading the white reference unlike the prior art.

Further, since it is sufficient that the voltage values of the output voltages V1, V2 corresponding to the reference charges Q1, Q2 in the standard state are stored in the ROM 23, it is possible to reduce the capacity of the ROM 23.

While the two reference charge outputs are obtained by using the two reference charge input portions 16a, 16b as described above, the present invention is not limited thereto and one reference charge output may be obtained by using a single reference charge input portion. In this case, it is possible to correct the fluctuation of the gain by calculating a difference between the reference charge output and the OPB (optical black) output.

However, if there are obtained a plurality of reference charge outputs, then it becomes possible to effect correction in a very small range. For example, a freedom with which the correction is effected can be increased, such as when the correction in the large amount of light or in the small amount of light can be selectively carried out.

Figure 11:
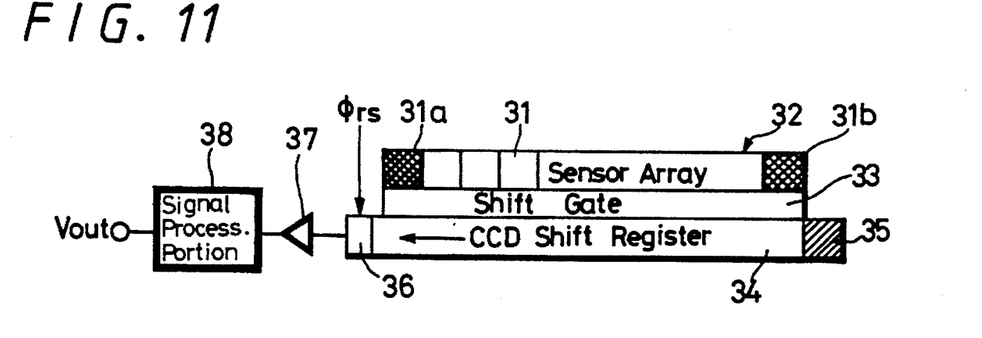
FIG. 11 is a schematic diagram showing a charge transfer device according to a second embodiment of the present invention which is applied to a linear sensor.

FIG. 11 is a diagram showing an arrangement of a charge transfer device according to a second embodiment of the present invention which is applied to a linear sensor.

As shown in FIG. 11, a sensor array 32 is composed of an array of a plurality of photosensors 31. In the sensor array 32, photosensors 31a, 31b provided at respective ends are shaded. All signal charges which are accumulated in the sensor array at the unit of pixels are parallelly read out through a shift gate 33 to a CCD shift register (charge transfer portion).

The CCD shift register 34 has a reference charge input portion 35 disposed on the opposite side of its output end. The reference charge input portion 35 is adapted to input a reference charge Q of a predetermined amount to the CCD shift register 34. As the reference charge input portion 35, it is possible to use such one which is of substantially the same structure as those of the reference charge input portions 16a, 16b shown in FIG. 5.

The reference charge Q is input to the CCD shift register 34 from the reference charge input portion 35 in synchronism with a timing at which a signal charge is read out from the sensor array 32 to the CCD shift register 34. Thus, a reference charge from the reference charge input portion 35 is input to the CCD shift register 34 at the opposite end bit of its output end. In that case, the photosensor 31b corresponding to that bit is shaded and therefore a signal charge can be prevented from entering the photosensor 31b.

The CCD shift register 34 sequentially transfers the signal charge read out from the sensor array 32 and the reference charge input thereto from the reference charge input portion 35 in the horizontal direction and supplies the same to a charge detecting portion 36.

The charge detecting portion 36 is formed of FD (floating diffusion) that is reset by the reset pulse φrs at every predetermined period. The charge detecting portion 36 detects the charge transferred thereto by the CCD shift register 34 and converts the same to a voltage which is then supplied through an output buffer 37 to a signal processing portion 38.

The signal processing portion 38 is adapted to correct the buffer output Va based on the signal charge obtained in the practical imaging state on the basis of the value of the buffer output Va in the standard state based on the reference charge Q and the value of the buffer output Va in the imaging state based on the reference charge Q. Therefore, as the signal processing portion 38, it is possible to use such one whose circuit arrangement is the same as that of the signal processing portion 22 shown in FIG. 4.

Figure 12:
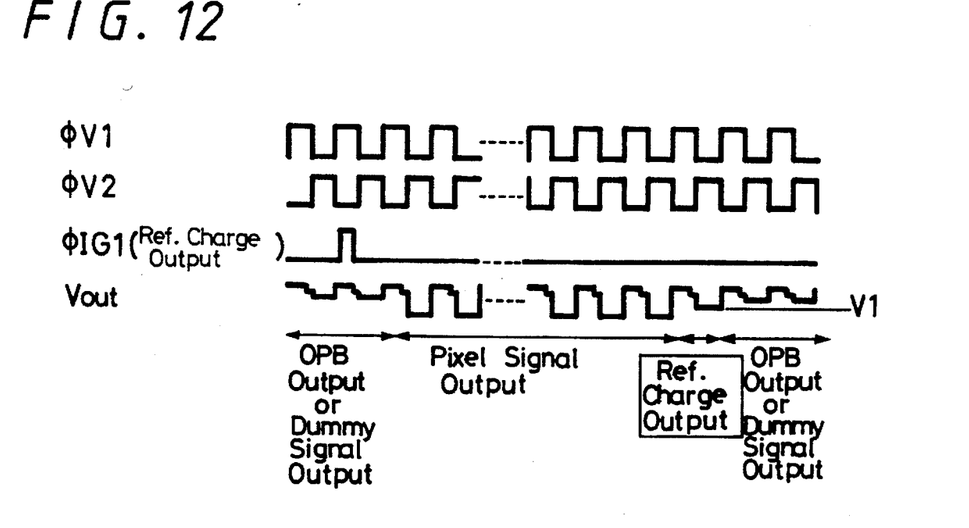
FIG. 12 is a timing chart of transfer clocks φH1, φH2, a sampling pulse φIG1 and a buffer output Va.

FIG. 12 is a timing chart of transfer clocks φH1, φH2 of the CCD shift register 34, a sampling pulse φIG1 of the reference charge input portion 35 and the buffer output Va. Study of FIG. 12 reveals that, after signal charges of respective pixels of the sensor array 32 are transferred and output, the reference charge input from the reference charge input portion 35 is transferred and output.

Since the photosensor 31a which is closest to the output end of the sensor array 32 is the OPB pixel, it is possible to detect the offset, such as the dark component or the like, by using this pixel signal.

When the charge transfer device according to the second embodiment of the present invention is applied to the linear sensor, similarly to the case that the present invention is applied to the area sensor, the signal processing portion 38 monitors the charge amount—output voltage characteristic on the basis of the buffer output Va corresponding to the reference charge and the OPB voltage. Then, it is possible to correct the offset (including the fluctuation of the dark current) of the output level and the fluctuation of the gain due to the change of temperature and the fluctuation of the power source voltage on the basis of the detected charge amount—output voltage characteristic.

While the reference charge Q is input to the CCD shift register 34 at its end bit opposite to its output end as described above, the present invention is not limited thereto and the reference charge Q may be input to a bit of somewhere of the CCD shift register 34. Also, the two reference charge input portions may be provided in order to input the two reference charges Q1, Q2 of different charge amounts to the CCD shift register 34 at its different bits similarly to the first embodiment that the charge transfer device according to the present invention is applied to the area sensor.

Figure 13:
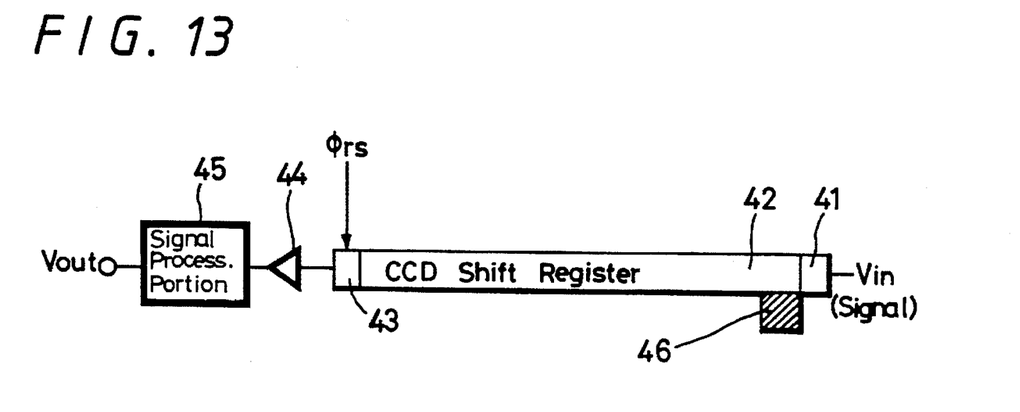
FIG. 13 is a schematic diagram showing a charge transfer device according to a third embodiment of the present invention which is applied to a CCD delay element.

While the present invention is applied to the area sensor and the linear sensor each of which is the CCD solid state imaging device as described above, the present invention is not limited to the CCD solid state imaging device and may be applied to a CCD delay element as shown in FIG. 13.

As shown in FIG. 13, a signal charge corresponding to a delayed input signal Vin is input from signal charge input portion 41 to a CCD shift register 42. This signal charge is sequentially transferred by the CCD shift register 42 and supplied to a charge detecting portion 43. An output voltage of the charge detecting circuit 43 is supplied through an output buffer 44 to a signal processing portion 45.

A reference charge Q of a predetermined amount is input by a reference charge input portion 46 to a bit of somewhere of the CCD shift register 42 similarly to the second embodiment.

As the signal processing portion 45, it is possible to use the signal processing portion 22 shown in FIG. 4. As the reference signal processing portion 45, it is possible to use such one whose arrangement is substantially similar to those of the reference charge input portions 16a, 16b shown in FIG. 5.

As described above, the present invention is not limited to the area sensor and the linear sensor and may be applied to the CCD delay element.

The circuit arrangements of the signal processing portions 22, 38 and 45 are described by way of example and may be modified variously.

As described above, according to the present invention, the following effects can be achieved.

According to the present invention, the output voltage in the standard state corresponding to the reference charge is stored and held in advance. The fluctuated amount of the charge amount—output voltage characteristic is detected by using the output voltage in the standard state corresponding to the reference voltage thus stored and held and the output voltage corresponding to the reference charge input to the charge transfer portion from the reference charge input portion in the imaging state. Then, the output voltage corresponding to the signal charge is corrected based on the detected fluctuated amount. Therefore, it is possible to compensate the offset of the output level and the fluctuation of the gain generated when the temperature is changed and the power supply voltage is fluctuated.

Further, according to the present invention, the output voltage of the charge detecting portion is temporarily stored and held. The correction signal corresponding to the fluctuated amount of the amount of light (charge amount)—output voltage characteristic is calculated by calculating the output voltage in the standard state corresponding to the reference charge previously stored and held and the output voltage in the imaging state corresponding to the reference charge temporarily stored and held. Then, the output voltage corresponding to the signal charge in the practical imaging state is corrected based on the correction signal thus calculated. Therefore, it is possible to detect and correct the fluctuated amount of the charge amount—output voltage characteristic by the simple circuit arrangement and in a simple digital calculation.

Furthermore, the present invention is applied to the area sensor which is the solid state imaging device and the linear sensor which is the solid state imaging device. Further, the present invention is applied to the delay element which delays the input signal. In any one of the above-mentioned applications, it is possible to compensate the fluctuation of the amount of light (charge amount)—output voltage characteristic caused when the temperature is changed and the power supply voltage is fluctuated.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A charge transfer device for imaging at variable ambient temperatures, comprising:

a signal charge input portion having sensors receiving light and creating a corresponding signal charge during imaging;

a first reference charge input portion creating a first reference charge during imaging, said first reference charge unaffected by ambient light;

a second reference charge input portion creating a second reference charge during imaging, said second reference charge unaffected by ambient light, said second reference charge being different in magnitude from said first reference charge;

a charge transfer portion connected to said signal charge input portion and said first and second reference charge input portions for transferring said signal charge and said first and second reference charges input thereto from said signal charge input portion and said first and second reference charge input portions;

a charge detecting portion connected to said charge transfer portion for converting said signal charge and said first and second reference charges transferred by said charge transfer portion into a first electrical signal representing said signal charge, a second electrical signal representing said first reference charge and a third electrical signal representing said second reference charge respectively and outputting said first, second and third electrical signals;

a signal processing portion associated with said charge detecting portion, wherein said signal processing portion includes a first storage portion for storing fourth and fifth electrical signals equivalent to said second and third electrical signals respectively and representing said first and second reference charges respectively taken at a preselected standard temperature;

said signal processing portion correcting said first electrical signal on the basis of said fourth and fifth electrical signals stored in said first storage portion and said second and third electrical signals.

2. A charge transfer device according to claim 1, wherein said signal processing portion is composed of an analog-to-digital converting portion for converting said first, second and third electrical signals into digital signals, a second storage portion in which said digital signals are stored temporarily, a calculating portion for calculating a correction signal based on said fourth and fifth signals stored in said first storage portion and said digital signals stored in said second memory portion and for correcting said digital signal corresponding to said first electrical signal on the basis of said correction signal.

3. A charge transfer device according to claim 1, wherein said signal charge input portion is composed of a plurality of photoelectric converting elements arrayed in a matrix fashion and read gates for reading out signal charges accumulated in said photoelectric converting elements.

4. A charge transfer device according to claim 1, wherein said charge transfer portion includes a plurality of vertical transfer portions arrayed at every vertical column of said plurality of photoelectric converting elements for transferring charges read out from said photoelectric converting elements in the vertical direction and a horizontal transfer portion for transferring charges transferred from said vertical transfer portions in the horizontal direction, and said first and second reference charge input portion inputs said reference charge to said vertical transfer portions.

5. A charge transfer device according to claim 1, wherein said signal charge input portion is composed of a plurality of photoelectric converting elements arrayed in one column and shift gates for reading out signal charges accumulated in said photoelectric converting elements to said charge transfer portion.

6. A charge transfer device according to claim 1, wherein said signal charge input portion inputs a signal charge corresponding to a delayed input signal to said charge transfer portion.

7. A charge transfer device according to claim 1, wherein said first, second and third electrical signals are output from said charge detecting portion at different timings from one another.

8. A charge transfer device according to claim 1, wherein said electrical signal is a voltage signal.

9. A charge transfer device according to claim 8, wherein charge amounts of said first and second reference charges are selected in a range in which a charge amount—output voltage characteristics of said charge detecting portion have a linearity.

10. A charge transfer device, comprising:

a charge transfer means;

a signal charge input means for receiving a photoelectric signal during imaging operation and for inputting a corresponding signal charge to said charge transfer means;

a reference charge input means for generating first and second reference charges unaffected by ambient light during imaging operation and for inputting said reference charges to said charge transfer means;

said charge transfer means for receiving said signal charge and said first and second reference charges and transferring said signal and reference charges in a sequential fashion;

a charge converting means for converting said signal charge and said first and second reference charges transferred thereto by said charge transfer means into first, second and third electrical signals respectively and outputting said first, second and third electrical signals, a magnitude of said first, second and third electrical signals being temperature dependent during imaging operation; and a signal processing means for receiving and processing said first, second and third electrical signals from said charge converting means, wherein said signal processing means includes a first storage means for storing therein first and second reference signals equivalent to said second and third electrical signals respectively corresponding to said first and second reference charges generated by said reference charge input means taken at a preselected standard temperature, and means for compensating said first electrical signal for fluctuations in temperature, using a voltage/charge characteristic of said first and second reference signals stored in said first storage means and said second and third electrical signals.

11. The charge transfer device according to claim 10, wherein the means for compensating modifies the first electrical signal by a factor α where $$\alpha = (V2 - V1/V21 - 11)$$ where V1 is an output voltage corresponding to the first reference signal and V2 is an output voltage corresponding to the second reference signal, and V11 corresponds to the second electrical signal and V21 corresponds to the third electrical signal.

12. The charge transfer device according to claim 10, wherein said signal processing means is composed of an analog-to-digital converting means for converting said first, second and third electrical signals of said charge detecting portion into first, second and third digital signals respectively, a second storage means in which said first, second and third digital signals are stored temporarily, a calculating means for calculating a correction signal based on said first and second reference signals stored in said first storage means and said second and third digital signals in said second storage means and for correcting the first digital signal in said second storage means on the basis of said correction signal.

13. A charge transfer device according to claim 10, wherein said signal charge input means is composed of a plurality of photoelectric converting elements arrayed in a matrix fashion and read gates for reading out signal charges accumulated in said photoelectric converting elements.

14. A charge transfer device according to claim 10, wherein said charge transfer means includes a plurality of vertical transfer portions arrayed at every vertical column of said plurality of photoelectric converting elements for transferring charges read out from said photoelectric converting elements in the vertical direction and a horizontal transfer portion for transferring charges transferred from said vertical transfer portions in the horizontal direction, and said reference charge input portion inputs said reference charge to said vertical transfer portions.

15. A charge transfer device according to claim 10, wherein said signal charge input portion is composed of a plurality of photoelectric converting elements arrayed in one column and shift gates for reading out signal charges accumulated in said photoelectric converting elements to said charge transfer portion.

16. A charge transfer device according to claim 10, wherein said signal charge input portion inputs a signal charge corresponding to a delayed input signal to said charge transfer portion.

17. A charge transfer device, comprising:

a charge transfer means;

a signal charge input means for receiving a photoelectric signal during imaging operation and for inputting a corresponding signal charge to said charge transfer means;

a reference charge input means for generating a reference charge unaffected by ambient light during imaging operation and for inputting a reference charge to said charge transfer means;

said charge transfer means for receiving said signal charge and said reference charge and transferring said signal and reference charges in a sequential fashion;

a charge converting means for converting said signal charge and said reference charge transferred thereto by said charge transfer means into first and second electrical signals respectively and outputting said first and second electrical signals, a magnitude of said first and second a signal processing means for receiving and processing said first and second electrical signals from said charge converting means, wherein said signal processing means includes a first storage means for storing therein a reference signal equal to said second electrical signal corresponding to said reference charge generated by said reference charge input means taken at a preselected standard temperature, and means for compensating said first electrical signal for fluctuations in temperature, using a voltage/charge characteristic of said reference signal stored in said first storage means and said second electrical signal; and wherein said reference charge input means further includes a further reference charge input portion, generating a further reference charge respectively of a different amount than said reference charge, and said charge transfer means also transfers said further reference charge to said charge converting means which converts said further charge into a third electrical signal dependent on temperature during the imaging operation, and said first storage means also stores a further reference signal, said further reference signal equal to said third electrical signal corresponding to said further reference charge generated by said further reference charge input means taken at said preselected standard temperature, and the means for compensating modifies the first electrical signal by a factor α where $$\alpha = (V2-V1/V21-V11) \text{ where}$$

V1 is an output voltage corresponding to the reference signal and V2 is an output voltage corresponding to the further reference signal, and V11 corresponds to the second electrical signal and V21 corresponds to the third electrical signal.

* * * * *